United States Patent Office 3,470,266
Patented Sept. 30, 1969

3,470,266
COMPOSITIONS CONTAINING AN EPOXY CURABLE RESIN AND A CURED AMINO-PLAST AS FILLER
Hans Batzer, Arlesheim, Otto Ernst, Pfeffingen, and Ulrich Niklaus, Basel, Switzerland, assignors to Ciba Limited, Basel, Switzerland, a company of Switzerland
No Drawing. Filed Oct. 24, 1966, Ser. No. 588,762
Claims priority, application Switzerland, Nov. 1, 1965, 15,037/65
Int. Cl. C08g 45/10, 51/14
U.S. Cl. 260—834      6 Claims

ABSTRACT OF THE DISCLOSURE

A curable filled resin composition containing at least one curable epoxy resin component and fillers wherein the fillers consist of a cured aminoplast resin which is insoluble in the curable resin component.

It is known to incorporate fillers with castings from casting resins, whereby in many cases the properties of the finished castings are considerably modified. Thus, an improvement in the mechanical properties and, for example, an improvement in the heat distortion characteristics according to Martens can be achieved, and quite generally the casting resin composition is rendered less costly. Further not immaterial advantages are the reduced shrinkage in volume occurring during curing and the reduced exothermic reaction. However, most of the known fillers have distinct disadvantages. Such disadvantages are, for example, the abrasive effect observed in the use of the most commonly employed inorganic fillers as well as the increase in the specific gravity of the castings. Above all, in the electrical industry the use of resins extended with fillers results in unsatisfactory arc resistance and stability to leak currents, and the dielectric loss is, in most cases substantially increased. The use of, for example, quartz meal as filler substantially impairs the good electrical properties of casting resins based on polyesters, polyurethanes and epoxides. To overcome these disadvantages it has already been proposed to use as fillers aluminium oxide trihydrate, alkaline earth metal carbonates (see German specification No. 1,189,277) or their sulphates (French specification No. 1,267,518) or their oxalates (German specification No. 1,129,694). While it is thus possible to produce castings that are stable towards leak currents and to a certain extent also to arcing, the dielectric loss angle $tg\delta$ is not reduced—in fact it is higher than with the unfilled casting resin composition, or for an equal loss factor the arcing stability is unsatisfactory, as in the case of ground chalk. Moreover, the said fillers based on oxalates are thermally objectionable because these compounds may decompose at relatively low temperatures. There are also known electrical insulators covered with a protective layer of material resistant to leak currents, but such components involve a considerable risk of an insufficient mechanical or chemical bond between coating and base which may increase the danger of breakdowns. Finally, German specification No. 1,137,209 discloses a process for the manufacture of castings by heat-setting casting compositions containing polyethylene or polypropylene as filler. However, when polyethylene or polypropylene are used as filler there are obtained castings whose mechanical properties are unsatisfactory and whose arc resistance is not good enough.

The aforementioned disadvantages are overcome fully or at least extensively by using cured aminoplasts as fillers. More especially, the resulting arcing stability and the dielectric loss angle are extremely favourable. Compared with polyethylene and polypropylene the castings containing the fillers of this invention display a distinctly improved behaviour in the electric arc and possess better mechanical properties.

Another advantage of the use of cured aminoplast fillers according to this invention is the fact that a relatively minor addition to an electrically inferior filler, such as quartz meal, suffices to produce a substantial improvement.

Accordingly, the present invention provides curable resin mixtures that can be cured without giving off volatile substances and contain at least one curable resin component as well as fillers, characterized in that the filler consists at least partially of a cured, comminuted aminoplast resin which is insoluble in the curable resin component.

The curable resin component may belong to any known type of curable resin+curing agent mixture or curable resin+curing agent precondensate that can be cured without giving off volatile substances.

Above all, there may be mentioned the curable systems based on epoxy resins and curing agents, as well as epoxy resin+curing agent precondensates, the curable systems based on unsaturated polyester resins, curing catalysts and possibly copolymerizable monomers, and finally the systems based on polyisocyanates and polyhydroxy compounds, which can be cured to form three-dimentional, crosslinked polyurethanes, such as polyhydroxypolyethers or polyhydroxypolyesters.

The term "curing" as used in this context describes the conversion of the aforementioned resin systems into insoluble and infusible, crosslinked products, generally accompanied by shaping operations to furnish shaped structures such as castings, mouldings or laminates, or flat structures such as lacquer films or cemented products.

The epoxy resins to be used may belong to any type of known polyepoxy compounds; relevant examples are:

Alicyclic polyepoxides such as vinylcyclohexene dioxide, limonene dioxide, dicyclopentadiene dioxide, ethyleneglycolbis(3,4 - epoxytetrahydro - dicyclopentadien - 8-yl)ether, (3,4-epoxytetrahydro-dicyclopentadien-8-yl)-glycidylether, epoxidized polybutadienes or copolymers of butadiene with ethylenically unsaturated compounds such as styrene or vinylacetate; compounds containing two epoxycyclohexyl residues such as diethyleneglycol-bis-(3,4-epoxycyclohexane carboxylate), bis-3,4-[epoxycyclohexylmethyl]succinate, 3.4 - epoxy - 6 - methylcyclohexylmethyl-3,4-epoxy-6-methlcyclohexane carboxylate and 3,4-epoxyhexahydrobenzal - 3,4 - epoxycyclohexane - 1,1 - dimethanol.

Further suitable are polyglycidyl esters obtained by reacting a dicarboxylic acid with epichlorohydrin or dichlorohydrin in the presence of alkali. Such polyesters may be derived from aliphatic dicarboxylic acids such as succinic or adipic acid or especially from aromatic dicarboxylic acids such as phthalic or terephthalic acid. As examples there may be mentioned diglycidyl adipate and diglycidyl phthalate.

Further suitable are basic polyepoxy compounds obtained by reacting primary or secondary aliphatic or aromatic diamines, such as aniline, toluidine, 4,4′-diaminodiphenylmethane, 4,4′-di-(monomethylamino)-diphenylmethane or 4,4′-diaminodiphenylsulphone with epichlorohydrin in the presence of alkali.

Preferred use is made of polyglycidyl ethers obtained by etherifying a dihydric or polyhydric alcohol or diphenol or polyphenol with epichlorohydrin or dichlorohydrin in the presence of alkali. These compounds may be derived from glycols such as ethyleneglycol, diethyleneglycol, triethyleneglycol, 1,3-propyleneglycol, 1,4-butanediol, 1,5-pentanediol, 1,6-hexanediol, 2,4,6-hexanetriol, glycerol, or especially from diphenols or polyphenols such as resorcinol, pyrocatechol, hydroquinone, 1,4-dihydroxynaphthalene, phenol-formaldehyde condensation products of the resol or novolak type, bis(para-hydroxyphenyl)methane,
bis(para-hydroxyphenyl)methylphenylmethane,
bis(para-hydroxyphenyl)tolylmethane,
4,4′-dihydroxydiphenyl,
bis(para-hydroxyphenyl)sulfone and especially
bis(para-hydroxyphenyl)dimethylmethane.

There may be specially mentioned the polyglycidyl ethers of bis(para-hydroxyphenyl)dimethylmethane (bisphenol A) corresponding to the average formula olate, tin-II-salts of carboxylic acids such as tin-II-octoate or alkali metal alcoholates, for example sodium hexylate.

Further, there are suitable as curing agents for the curable epoxy resin systems also catalytic curing agents that cause polymerization of the epoxy resins; relevant examples are tertiary amines such as benzyldimethylamine, Mannich's bases such as tris(dimethyl)aminomethylphenol; reaction products of aluminium alcoholates or phenolates with compounds of tautomeric reaction of the acetoacetic ester type; Friedel-Crafts catalysts, for example $AlCl_3$, $SbCl_5$, $SnCl_4$, $ZnCl_2$, $BF_3$ and their complexes with organic compounds such, for example, as $BF_3$-amine complexes; metal fluoroborates such as zinc fluoborate; phosphoric acid; boroxines such as trimethoxyboroxin; metal chelate compounds.

Instead of such epoxy resin+curing agent systems there may be used soluble and fusible, so-called B-stages, obtained by precondensation of epoxy resin and a suitable curing agent, for example an aromatic polyamine such as para,para′-diamino-diphenylmethane or meta-phenylenediamine, or a carboxylic acid anhydride such as phthalic anhydride.

The curable systems based on epoxy resins may further contain suitable plasticizers such as dibutyl phthalate, dioctyl phthalate or tricresyl phosphate, inert diluents or so-called active diluents, more especially monoepoxides, for example butylglycide or cresylglycide.

The unsaturated polyesters present in the curable mixtures of the invention may likewise belong to any known type. There may be mentioned:

(a) Unsaturated polyesters in the narrower sense from

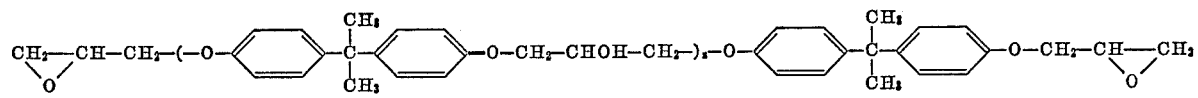

where z is a whole or fractional number from 0 to 2.

There may also be used mixtures of two or more of the epoxy resins mentioned above.

For the curable epoxy resin systems there may be used in principle any known type of curing agent. Suitable curing agents are those types which act by polyaddition without giving off volatile substances, for example amines or amides, such as aliphatic and aromatic primary and secondary amines, such as para-phenylenediamine, bis-(para-aminophenyl)-methane, ethylenediamine, N,N-diethylethylenediamine, diethylenetriamine, tetra(hydroxyethyl) diethylenetriamine, triethylenetetramine, N,N-dimethylpropylenediamine, dicyandiamide; soluble urea-formaldehyde resins, soluble melamine-formaldehyde resins; polyamides for example those from aliphatic polyamines and dimerized or trimerized, unsaturated fatty acids; polyhydric phenols, for example resorcinol, bis(4-hydroxyphenyl)-dimethyl-methane, phenol-formaldehyde resins; or especially polybasic carboxylic acids and their anhydrides, for example phthalic, tetrahydrophthalic, hexahydrophthalic, methyl-hexahydrophthalic endomethylenetetrahydrophthalic, methyl-endomethylene-tetrahydrophthalic anhydride (=methylnadic anhydride), hexachloroendomethylene - tetrahydrophthalic, succinic, adipic, maleic, allylsuccinic, dodecenylsuccinic anhydride; 7-allyl-bicyclo-(2.2.1)hept-5-ene-2,3-dicarboxylic acid anhydride, pyromellitic acid dianhydride and mixtures of such anhydrides. Preferred use is made of curing agents that are liquid at room temperature. If desired, there may be additionally used a curing accelerator such as a tertiary amine or a salt or quaternary ammonium compound thereof, for example tris(dimethylaminomethyl)phenol, benzyldimethylamine or benzyldimethylammonium phen- α,β-unsaturated dicarboxylic or polycarboxylic acids and diols or polyols which may be modified with saturated dicarboxylic or polycarboxylic acids. As α,β-unsaturated polycarboxylic acids, from which such polyesters are derived, there may be mentioned: Maleic, fumaric, mesaconic, citraconic, itaconic, tetrahydrophthalic and aconitic acid.

As diols of polyols, from which such unsaturated polyesters may be derived, there may be mentioned: Ethyleneglycol, diethyleneglycol, triethyleneglycol, propyleneglycol-1,2, propyleneglycol-1,3, butanediol-1,4, 2-methylpentanediol-2,4, pentanediol-1,5, hexanediol-1,6; bis-β-hydroxyethyl ether of bisphenol A [2,2′-bis(para-hydroxyphenyl)-propane] or of tetrachloro-bisphenol A; glycerol, diglycerol, trimethylolethane, trimethylolpropane, butanetriol-(1,2,4); hexanetriol, pentaerythritol, pentachlorophenylglycerol ether.

As saturated dicarboxylic or polycarboxylic acids which, if desired, may be additionally used for modifying the unsaturated polyesters, there may be mentioned as examples: Oxalic, succinic, glutaric, adipic, pimelic, suberic, azelaic, sebacic, hexahydrophthalic and tricarballylic acid; furthermore phthalic, isophthalic, terephthalic, 2,6-naphthalenedicarboxylic, diphenyl - ortho,ortho′-dicarboxylic acid, ethyleneglycol - bis - (para - carboxyphenyl)-ether, tetrachlorophthalic acid, hexachloro-endomethylene-tetrahydrophthalic and tetrachlorosuccinic acid.

(b) Unsaturated polyesters from unsaturated dialcohols or polyalcohols and unsaturated dicarboxylic or polycarboxylic acids, which may be modified by saturated dialcohols or polyalcohols and/or saturated dicarboxylic or polycarboxylic acids. As unsaturated polyols, from which such polyesters are derived, there may be mentioned: 1,6- bis(hydroxymethyl)-2,5-endomethylene-cyclohexene-3, 1, 1-bis(hydroxymethyl)-cyclohexene-3 and 1,1-bis(hydroxymethyl)-6-methylcyclohexene-3.

As unsaturated polycarboxylic acids and as possibly additionally used saturated polycarboxylic acids and saturated polyalcohols, there are suitable for use in the synthesis of the unsaturated polyesters listed under (b) the same as for the unsaturated polyesters shown under (a).

(c) The still soluble and fusible prepolymers and telomers obtained by prepolymerization or telomerization of the diallyl esters or bis(chlorallyl)esters of dicarboxylic acids, especially of aromatic dicarboxylic acids such as phthalic acid, in the presence of a suitable regulator or telogen, such as alcohols, ketones, hydrogen chlorides, dialkyl phosphites, for example the prepolymers of diallyl phthalate marketed under the registered tradename Dapon.

For such curable, unsaturated polyester resin systems there may be used the known, radical-forming curing catalysts, especially organic peroxides such as benzoyl peroxide, methylethylketone peroxide, tertiary butylhydroperoxide, ditertiary butyl peroxide or hydroxycyclohexyl hydroperoxide.

As curing accelerators there may be further added possibly soluble metal salts, for example vanadium salts such as vanadium phosphonates, also iron, nickel and especially cobalt salts of higher organic acids such as cobalt octoate or cobalt naphthenate. An addition of such metal accelerators is particularly advantageous if the composition is to be used for producing coatings or the like which are to be cured in the presence of atmospheric oxygen, because in this case the polymerization curing in the mass is promoted and improved by an additional oxidative drying process on the surface. Tertiary aromatic amines, such as N,N-dialkylanilines, are likewise suitable as curing accelerators.

The unsaturated polyester resin systems further contain advantageously copolymerizable monomers, especially styrene or diallyl phthalate. Furthermore, there may be added organic solvents and/or plasticizers to them.

Among the curable systems based on polyisocyanates and curing agents, such as polyhydroxy compounds, there are suitable all those types which on curing form three-dimensional, crosslinked, insoluble and infusible products.

As suitable polyisocyanate components there may be mentioned among others: Diisocyanates such as naphthalene-1,5-diisocyanate, toluylene-diisocyanate-2,4 and toluylene-diisocyanate-2,6, diphenylmethane-4,4'-diisocyanate and above all prepolymers from an excess of diisocyanate and polyols, polyethers, polyesters or polyamines. Such prepolymers have a residual content of free isocyanato groups and form on curing with further quantities of polyol, polyether, polyester or polyamine three-dimensional, crosslinked products.

As crosslinking agents, both for the manufacture of prepolymers containing isocyanato groups and as curing agents, there are used above all polyhydroxy compounds; as examples there may be mentioned: Polyesters of adipic acid, phthalic acid or dimerized unsaturated fatty acids with diols and/or triols such as ethyleneglycol, 1,4-butanediol, 1,5-pentanediol, glycerol, diethyleneglycol; castor oil; linear or partially branched polypropylene ether glycols, polytetramethylene ether glycols; polythioether glycols, polyacetal glycols; sugars and sugar derivatives; higher functional polyols, such as trimethylolpropane; polyamines, above all aromatic polyamines such as diaminodiphenylmethane; compounds containing at the same time hydroxyl and amino groups, such as tri-isopropanolamine.

The curable systems based on polyisocyanates and crosslinking agents capable of forming three-dimensional crosslinked polyurethanes contain, in addition to the polyisocyanate or the prepolymer from excess polyisocyanate and polyhydroxy compound and/or polyamine, and the crosslinking agent containing hydroxyl and/or amino groups, as a rule also catalyically acting curing accelerators such, for example, as tertiary amines, alkali or alkaline earth metal hydroxides, heavy metal ions in the form of their salts or complexes, for example stannous or stannic compounds such as stannous acetate or stannic dibutyllaurate. To prevent the formation of bubbles owing to the presence of traces of water in the crosslinking components or fillers, which might cause the evolution of carbon dioxide, it is of advantage further to add to such curable systems based on polyisocyanates also a drying agent, for example a sodium aluminium silicate.

Other curable resin systems that cure without elimination of volatile substances are, for example, mixtures of polyoxetanes, such as 2,6-dioxa-spiro-(3,3)heptane, di-(3-ethyl-1-oxacyclobutyl-3-methyl)-adipic acid ester, di-(3-ethyl-1-oxacyclobutyl-3-methyl)-phthalic acid ester or para,para'-bis-(3'-ethyl-1-oxyacyclobutyl-3'-methoxy)-diphenyl-2,2-propane, with curing agents, especially polycarboxylic acid anhydrides, for example phthalic anhydride or hexachloroendomethylene-tetrahydrophthalic anhydride (=chloroendic acid anhydride). Further to be mentioned are the curable resin systems from bis-(dihydropyranyl)-compounds, for example 2,3-dihydro-1,4-pyran-2-carboxylic acid (2',3'-dihydro-1',4'-pyran-2'-yl)methyl ester and polyfunctional crosslinking compounds, especially polyhydroxy compounds, for example glycerol and/or curing catalysts, especially Lewis acids, for example $BF_3$ and its complexes.

As further examples of curable resin systems that undergo curing without giving off volatile substances there may be mentioned the dimeric or oligomeric bis(cyclopentadienyl) compounds which can be cured by mere heating, for example at temperatures of at least 160° C., to form three-dimensional crosslinked products having good electrical properties, for examples dimeric 1,4-bis(cyclopentadienyl)-butene-2, oligomeric 1,5-bis(cyclopentadienyl)-pentane, dimeric dicyclopentadienyldimethyl-silane or dimeric $\alpha,\alpha'$-bis(cyclopentadienyl)-paraxylene. These oligomeric bisdienes may also be used in conjunction with unsaturated polyesters and/or still fusible or liquid, soluble polymers or copolymers of dienes, such as butadiene or isoprene.

The curable resin systems to be used in this invention may, of course, further contain the usual additives, such as mould lubricants, anti-ageing agents, flame-inhibitors, dyestuffs or pigments.

The cured and comminuted aminoplast resins to be used according to this invention as fillers for the curable resin systems may be added to the combination of resin and curing agent or to the curable resin component or to the curing component.

The cured aminoplast resins are manufactured in the known manner, either by first reacting in the usual way an aminoplast former, such as melamine or urea, with an aldehyde, especially formaldehyde, to form a still soluble and fusible aminoplast resin, which is then in a second stage cured to form an insoluble and infusible product in the known manner, for example with the use of heat and in the presence of a suitable curing catalyst.

Alternatively, an insoluble and infusible aminoplast resin may be manufactured directly in known manner by a single-stage process by a suitable selection of the reaction conditions. In this variant, depending on the reaction conditions employed, the cured aminoplast resin may result directly in comminuted form, as a powder or a granulate, for example when working in a solution or suspension, with the insoluble resin settling out as a more or less fine precipitate, or when curing is performed while at the same time subjecting the product to a combined drying and atomizing operation. It is also possible to perform the curing in the mass, the cured product then being comminuted by a suitable machine, for example a pounding, ball or roller mill to the desired particle size, which depends on the ulterior use and may vary from fairly large lumps to granulates or even fine powders.

In the following description and in the claims the term "aminoplast" has the usual meaning; it includes above all the condensation products of aldehydes, especialy formadehyde, if desired in conjunction with other aldehydes, such as acetaldehyde, butyraldehyde, benzaldehyde, salicylaldehyde, glyoxal, acrolein, furfural and crotonaldehyde, with aminoplast formers such as urea, thiourea, cyanamide, dicyandiamide, aminotriazines, urethanes, guanidine, ammonium thiocyanate, metal rhodanides such as calcium or aluminium rhodanide, guanyl thiourea and other urea derivatives or their methylol compounds. Suitable urea derivatives are, for example, alkyl or aryl ureas or thioureas, alkyleneureas or diureas such as ethyleneurea and propyleneurea, dihydroxyethyleneurea and acetylenediurea.

Suitable triazine components are, apart from melamine, as the most important representatives also N-substituted melamines such as N-butylamine, N-phenylmelamine, N-tolylmelamine, N,N-diallylmelamine and N-tertiary octylmelamine, and also melam, melem, ammeline, ammelide, 2,4-diamino-6-phenylamino-1,3,5-triazine, aminotriazines substituted by allyloxy groups, guanamines such as formoguanamine, acetoguanamine, caproguanamine, caprylo-guanamine, lauroguanamine, stearoguanamine, linoleoguanamine, $\Delta^3$-tetrahydrobenzoguanamine, hexahydrobenzoguanamine, benzoguanamine, ortho-, meta- and paratoluguanamine and diguanamines, for example those of the general formulae

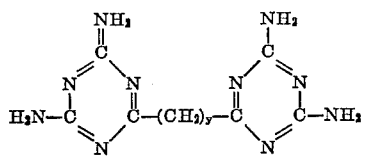

in which $y$ is a small number, such as adipoguanamine.

Residues containing hydroxyl groups in the condensation products, such as methylol groups, may also be wholly or only partially etherified with methanol, ethanol, n-propanol, isopropanol, n-butanol, isobutanol, methylcyclohexanol, borneol, isoborneol and/or other saturated alcohols. The etherification may also be performed with unsaturated alcohols, such as allyl alcohol, methallyl alcohol or 2-buten-1-ol, abietinol or partially etherified dihydric or polyhydric alcohols, such as alkoxyethanols, alkoxypropanols or the like. Condensates containing free hydroxyl groups may also have been etherified by reaction with an alkylene oxide, such as ethylene oxide, 1,2-propylene oxide, 1,2-butylene oxide or the like, and in this case the adducts are stabilized by blocking the terminal groups. Suitable urethanes are above all the lower alkyl-urethanes such as methylurethane, ethylurethane, butylurethane and their methylol derivatives, for example methylolbutylurethane. The aminoplast resins to be used according to this invention may also contain modifying additives or they may have been sulphurized; suitable modifying agents of this kind are phenol, cresols, xylenols, butylphenol, octylphenol or nonylphenol and also salicylic acid, especially in the form of precondensates based on formaldehyde and phenol, cresol or xylenol; such methylol compounds or higher condensed novolacks may be added at any desired stage of condensation. Further possible additives comprise proteins, such as acid casein, alkyd resins, aniline and alkylanilines and their formaldehyde resins, carboxylic acid amides, such as acetamide, hexamethylenetetramine, ethylene-imine polymers such as natural resins, for example colophony or copal resins. Sulphurizing is generally carried out by adding sulphur or a sulphur donor, such as hydrogen sulphide, di-sulphur dichloride, ammonium sulphide or a polysulphide.

The amount of cured, comminuted aminoplast added may vary from 1 to 80% by weight, referred to the weight of the mixture as a whole; an addition from 10 to 60% by weight is preferred.

Apart from the newly proposed fillers based on aminoplast resins there may be added, if desired, to the curable resin mixtures further known fillers and/or reinforcing agents, for example glass fibres, mica, quartz meal, cellulose, kaolin, ground dolomite, colloidal silica having a large specific surface (Aerosil) or metal powders, such as aluminium powder.

The resin mixtures filled according to this invention are preferably used in the casting resin sector in industry. The resulting castings may be used as widely varying structural components, especially in the electrical industry, particularly, for example, as high-voltage line holders, pin type and suspension insulators, including their use in the open air, and for insulating components of electrical switchgear such as load shedding switches and quenching chambers; also for grommets and in the construction of voltage and current transformers. The curable resin mixtures may however also be used with advantage in other sectors, for example as laminating resins, binders, moulding compositions, sinter powders, coating compositions, sealing compositions and putties, impregnating and dipping resins.

Unless otherwise indicated, parts and percentages in the following examples are by weight. The relationship between parts by volume and parts by weight is the same as that between millilitre and gram.

EXAMPLE 1

7 castings from epoxy resin were prepared in the following manner:

30 parts of phthalic anhydride as curing agent were dissolved at 120 to 130° C. in 100 parts of a polyglycidyl ether resin (epoxy resin A) which is solid at room temperature, contains 2.6 epoxide equivalents per kg. and has been obtained by reacting epichlorohydrin with bis-(4-hydroxyphenyl)-dimethylmethane in the presence of alkali. To this casting resin mixture there were added at 120 to 130° C.: In test 1 no filler; in test 2 40 parts of quartz meal marketed under the tradename "Quartz Meal K8"; in test 3 80 parts, in test 4 200 parts of this filler; in test 5 200 parts of aluminium oxide trihydrate and in test 6 30 parts of polypropylene powder. In test 7 there were added at 120 to 130° C. as filler 40 parts of an infusible, comminuted melamine-formaldehyde condensation product (MF-resin A) having a bulk weight of 280 g./litre, which had been obtained by reacting 5 mols of formaldehyde with 1 mol of melamine in an aqueous medium at pH=6.5 to 6.6 at a temperature from 90 to 100° C., followed by filtration, washing with water and drying at 120–130° C.

To determine the properties listed in the following table one part of each casting resin mixture was cast at 120° C. in aluminium moulds (40 x 10 x 140 mm.; 130 x 130 x 2 mm.; 130 x 130 x 4 mm.) and each specimen was cured for 24 hours at 140° C. Apart from the known advantages of the addition of fillers the cured casting resin mixture 7 of this invention displays, in addition to similar mechanical properties and a comparable heat distortion characteristic according to Martens, the highest stage of arc resistance L 4, whereas specimen 1 (without filler) displays the lowest stage L 1. On addition of 40 parts of "Quartz Meal K8" the filler sediments notwithstanding the addition of 5 parts of a silica having a very large specific surface, marketed under the tradename Aerosil (test 2). Only when 80 parts of "Quartz Meal K8" are added (test 3) there are obtained castings of uniform composition. Test specimens 3 and 4, which are filled with quartz meal, display in comparison with the test specimen 7 of this invention in addition to poorer mechanical properties a distinctly poorer arc resistance (stage 1) and a substantially higher dielectric loss factor $tg\delta$ at 20° and 80° C.

TABLE 1

| Test specimen | 1 | 2 | 3 | 4 | 5 | 6 | 7 |
|---|---|---|---|---|---|---|---|
| Epoxy resin A | 100 | 100 | 100 | 100 | 100 | 100 | 100 |
| Phthalic anhydride | 30 | 30 | 30 | 30 | 30 | 30 | 30 |
| Polypropylene (powder) | | | | | | 30 | |
| Quartz meal K8 | | 40 | 80 | 200 | | | |
| Alumina trihydrate | | | | | 200 | | |
| MF-resin A | | | | | | | 40 |
| Aerosil | | 5 | | 5 | | | |
| Deflection on fractioning, mm | 12.5 | (1) | 6.4 | 3.9 | 3.1 | 4.8 | 9.1 |
| Flexural strength VSM 77103 (in kg./mm.$^2$) | 12.7 | | 12.4 | 11.7 | 6.2 | 6.4 | 14.3 |
| Impact strength VSM 77105 (in cm. kg./cm.$^2$) | 13.0 | | 5.8 | 6.3 | 5.1 | 7.5 | 9.2 |
| Heat distortion point according to Martens DIN 53458, in °C | 94 | | 105 | 110 | 115 | 90 | 100 |
| Arc resistance DIN 53484 (stage) | L 1 | | L 1 | L 1 | L 4 | L 1 | L 4 |
| Dielectric loss factor VDE 0303 tgδ (50 c.p.s.): | | | | | | | |
| In percent at 20° C | 0.3 | | 2.1 | 2.0 | 8.5 | 0.3 | 0.3 |
| In percent at 80° C | 0.5 | | 4.7 | 4.3 | >10 | 0.5 | 0.5 |

1 Casting in homogeneous, filler sedimented.

As can be seen from the results of test 5, the arc resistance of castings can likewise be raised to the highest stage L 4 by using aluminium oxide trihydrate, but this is accompanied by relatively poor mechanical properties and above all by a very high dielectric loss factor $tg\delta$ which is unacceptable for many applications. Test specimen 6, which is filled with polypropylene, displays poorer mechanical properties and above all an unsatisfactory behaviour in the electric arc.

EXAMPLE 2

80 parts of hexahydrophthalic anhydride and 1.5 parts of benzyldimethylamine as curing accelerator are dissolved at 80° C. in 100 parts of a polyglycidyl ether resin (epoxy resin B) containing 5.4 epoxide equivalents per kg. and having a viscosity of 10,000 centipoises at 25° C., which has been prepared by reacting epichlorohydrin with bis-(4-hydroxyphenyl)-dimethylmethane in the presence of alkali. In tests 1 to 7 there are added at 80° C. to this casting resin mixture the fillers listed in the following table, and after gelling each specimen is cured for 4 hours at 80° C. and then for 12 hours at 120° C.

The MF-resins B and C are insoluble melamine-formaldehyde resins condensed in acid 30% aqueous solution (molecular ratio 1:4) which, in the comminuted form, have a bulk weight of 500 g. per litre. Whereas the MF-resin B has been dried in a heating cabinet at 120° C. and when measured by the nitrogen absorption method displayed a specific surface of less than 5 m.$^2$ per gram, the MF-resin C was dehydrated azeotropically with the aid of benzene and displayed a specific surface of about 308 m.$^2$/gram.

The HF-resin A was manufactured by condensing 1 mol of urea with 2 mols of formaldehyde in an aqueous solution at a pH value from 5.8 to 6.3. The resulting water-soluble condensate was dehydrated by spray drying and then further condensed for 4 hours at 120° C. to form an insoluble urea-formaldehyde resin which in the comminuted form had a bulk weight of about 400 g. per litre.

Compared with the reference specimens 1 to 4, the specimens 5 to 7 of this invention again display distinct advantages. Suitable combinations may, inter alia, be successfully employed for potting pin type and suspension insulators, voltage and current transformers, grommets and in the manufacture of switchgear for the construction of switch chambers and especially also for electrical purposes in the case of components affected by electric arcs. Their good mechanical and electrical properties make them also suitable for external uses.

TABLE 2

| Test | 1 | 2 | 3 | 4 | 5 | 6 | 7 |
|---|---|---|---|---|---|---|---|
| Epoxy resin B | 100 | 100 | 100 | 100 | 100 | 100 | 100 |
| Hexahydrophthalic anhydride | 80 | 80 | 80 | 80 | 80 | 80 | 80 |
| Benzyldimethylamine | 1.5 | 1.5 | 1.5 | 1.5 | 1.5 | 1.5 | 1.5 |
| Quartz meal K8 | | 300 | | | | | |
| Aluminium oxide trihydrate | | | 300 | | | | |
| Polypropylene (powder) | | | | 70 | | | |
| MF-resin B | | | | | 180 | | |
| MF-resin C | | | | | | 120 | |
| HF-resin A | | | | | | | 130 |
| Deflection, in mm | 9.5 | 3.8 | 2.2 | 2.9 | 5.0 | 5.5 | 4.8 |
| Flexural strength, in kg./mm.$^2$ | 12.7 | 6.5 | 6.0 | 4.6 | 10.9 | 10.8 | 8.1 |
| Impact strength, in cm. kg./cm.$^2$ | 6 | 4 | 2.2 | 2.8 | 5.5 | 6.0 | 5.4 |
| Heat distortion point according to Martens DIN 53458, in ° C | 119 | 105 | 100 | 71 | 102 | 92 | 108 |
| Arc resistance DIN 53484 (stage) | L 1 | L 1 | L 4 | L 1 | L 4 | L 4 | L 4 |
| Dielectric loss factor VDE 0303 tgδ (50 c.p.s.): | | | | | | | |
| In percent at 20° C | 0.5 | 3.0 | 5.0 | 0.5 | 0.9 | 0.9 | 0.8 |
| In percent at 80° C | 0.5 | 5.2 | 10 | 0.6 | 0.8 | 1.4 | 0.8 |

EXAMPLE 3

The procedure is as described in Example 1, except that in this case 35 parts of phthalic anhydride per 100 parts of epoxy resin A and as filler in part mixtures of quartz meal and MF-resin D are used. All these casting resin mixtures have practically identical casting properties. MF-resin D is a melamine-formaldehyde resin [molecular ratio 1:2] prepared in an aqueous, alkaline medium which in the form of a precondensate is dehydrated by spray drying and then further condensed for 4 hours at 120° C. in a heating cabinet to form an insoluble and infusible resin: in the comminuted form it has a bulk weight of about 600 g. per litre.

TABLE 3

| Test | 1 | 2 | 3 | 4 |
|---|---|---|---|---|
| Epoxy resin A | 100 | 100 | 100 | 100 |
| Phthalic anhydride | 35 | 35 | 35 | 35 |
| MF-resin D | | 25 | 50 | 100 |
| Quartz meal K8 | 200 | 150 | 100 | |
| Arc resistance DIN 53484 (stage) | L1 | L1 | L4 | L4 |
| Leakage current stability VDE 0303 (stage) | KA1 | KA1 | KA3b | KA3b |
| Dielectric loss factor VDE 0303 tgδ (50 c.p.s.) in percent: | | | | |
| At 20°C | 2.6 | 1.75 | 1.2 | 0.8 |
| At 80°C | 4.5 | 3.5 | 2.8 | 1.2 |

EXAMPLE 4

In tests 1 to 5 12 parts each of a sodium alcoholate, obtained by dissolving 0.82 part of sodium metal at 120° C. in 100 parts of 2,4-dihydroxy-3-hydroxymethyl-pentane, are dissolved in 100 parts each of the cycloaliphatic polyepoxy resin (epoxy resin C) of the formula

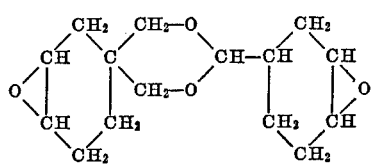

containing 6.3 epoxide equivalents per kg. Each mixture is heated to 80° C. and 95 parts of the curing agent hexahydrophthalic anhydride are fused in it. Specimen 1 does not contain a filler, whereas the following fillers are added to the other specimens: To specimen 2 420 parts of quartz meal, to specimen 3 350 parts of aluminum oxide trihydrate, to specimen 4 150 parts of the melamine-formaldehyde resin B described in Example 2, and to specimen 5 120 parts of the MF-resin D described in Example 3. The casting resin mixtures thus prepared are cast at 80° C. in aluminum moulds as described in Example 1 and cured for 4 hours at 80° C. and then for 12 hours at 120° C.

TABLE 4

| Test | 1 | 2 | 3 | 4 | 5 |
|---|---|---|---|---|---|
| Epoxy resin C | 100 | 100 | 100 | 100 | 100 |
| Hexahydrophthalic anhydride | 95 | 95 | 95 | 95 | 95 |
| Sodium alcoholate | 12 | 12 | 12 | 12 | 12 |
| Quartz meal K8 | | 420 | | | |
| Aluminium trioxide hydrate | | | 350 | | |
| MF-resin B | | | | 150 | |
| MF-resin D | | | | | 120 |
| Arc resistance DIN 53484 (stage) | L4 | L4 | L4 | L4 | L4 |
| Dielectric loss factor VDE 0303 tgδ (50 c.p.s.) in percent: | | | | | |
| At 20°C | 0.5 | 3.8 | 3.0 | 0.7 | 0.5 |
| At 100°C | 0.5 | 6.8 | 10 | 0.5 | 0.5 |
| At 150°C | 0.7 | 10 | 10 | 4.5 | 4.0 |

EXAMPLE 5

98 parts of a polyether containing 10.5–12% of hydroxyl groups, prepared from propylene oxide and a triol [acid number 0.1; viscosity 600 centipoises at 25° C.; average molecular weight 450] marketed under the registered tradename Desmophen 550U, are mixed with 120 parts of a polyisocyanate modified on the basis of 4,4′-diaminodiphenylmethane [isocyanate content 30%; viscosity 150 centipoises at 25° C.] marketed under the registered tradename Desmodur VL, and with 12 parts of castor oil and 40 parts of a 50% paste of a sodium aluminium silicate having zeolith structure in castor oil (tradename Sikkativ NAS) and the whole is intimately mixed at room temperature. In specimen 1 324 parts of quartz meal are incorporated and in specimen 2 215 parts of the MF-resin D described in Example 3. After having been cured for 24 hours at 40° C. the specimen 2 of this invention displays in addition to slightly better mechanical properties a considerably better arc resistance and leakage current stability and lower dielectric losses.

TABLE 5

| Test | 1 | 2 |
|---|---|---|
| Desmophen 550U | 98 | 98 |
| Desmodur VL | 120 | 120 |
| Castor oil | 12 | 12 |
| Sikkativ NAS | 40 | 40 |
| Quartz meal K8 | 324 | |
| MF-resin D | | 215 |
| Deflection, in mm | 2.5 | 3.0 |
| Flexural strength VSM 77103, in kg./mm.² | 5 | 5.9 |
| Impact strength VSM 77105, in cm. kg./cm.² | 2.5 | 3.3 |
| Heat distortion point according to Martens DIN 53458, in °C | 54 | 53 |
| Arc resistance DIN 53484 (stage) | L1 | L4 |
| Leakage current stability VDE 0303 (stage) | KA1 | KA3c |
| Dielectric loss factor VDE 0303 tgδ (50 c.p.s.) in %: | | |
| At 20°C | 1.3 | 1.0 |
| At 60°C | 1.6 | 1.1 |

EXAMPLE 6

The casting resin mixtures (tests 1 to 13) listed in the following Table 6 are prepared at room temperature, cast in the same moulds as used in Example 1 and then cured as indicated to form cured castings.

In the Table 6

Polyester resin I is a commercial product marketed under the registered tradename Polylite TX, being an unsaturated, highly transparent low-viscous polyester resin modified with acrylic ester.

Polyester resin II is a styrene-modified, unsaturated, liquid polyester resin marketed under the registered tradename Polylite 8001. Acid number <30; styrene content 33%; viscosity 1200 centipoises at 20° C.; specific gravity 1.13.

Polyester resin III is a styrene-modified, unsaturated polyester resin marketed under the registered tradename Leguval W50; acid number <15; styrene content 40%; viscosity 3000 centipoises at 20° C.; specific gravity 1.10.

Polyester resin IV is a styrene-modified, unsaturated polyester resin marketed under the registered tradename Koplac 2000–25; acid number 20–30; styrene content 30%; viscosity 2400 centipoises at 25° C.; specific gravity 1.14.

The casting resin combinations of this invention, filled with cured aminoplasts, display in the cured state, compared with unfilled systems or with systems filled with quartz meal, a considerably better arc resistance and, compared with the last-mentioned systems, additionally also a lower dielectric loss at room temperature.

TABLE 6

| Test | 1 | 2 | 3 | 4 | 5 | 6 | 7 | 8 | 9 | 10 | 11 | 12 | 13 |
|---|---|---|---|---|---|---|---|---|---|---|---|---|---|
| Polyester resin: I | 100 | 100 | 100 | | | | | | | | | | |
| II | | | | 100 | 100 | 100 | 100 | | | | | | |
| III | | | | | | | | 100 | 100 | 100 | | | |
| IV | | | | | | | | | | | 100 | 100 | 100 |
| Methylethylketone peroxide (40% solution in dibutylphthalate) | 3 | 3 | 3 | | | | | 3 | 3 | 3 | | | |
| Solution of cobalt naphthenate in dibutylphthalate (containing 6% of cobalt metal) | 0.2 | 0.2 | 0.2 | | | | | 0.2 | 0.2 | 0.2 | | | |
| Benzoylperoxide (50% paste in dibutylphthalate) | | | | 4 | 4 | 4 | 4 | | | | 4 | 4 | 4 |
| 5% solution of N,N-diethylaniline in dibutylphthalate | | | | 1 | 1 | 1 | 1 | | | | 1 | 1 | 1 |
| Quartz meal K8 | | 160 | | | 120 | | | | 100 | | | 100 | 0 |
| MF-resin A | | | 20 | | | | | | | 20 | | | |
| MF-resin B | | | | | | 75 | | | | | | | 50 |
| HF-resin A | | | | | | | 40 | | | | | | |
| Heat distortion point accdg. to Martens DIN, in °C | 52 | 61 | 51 | 46 | 62 | 56 | 51 | 54 | 67 | 55 | 48 | 60 | 46 |
| Arc resistance (stage) | | L 1 | L 1 | L 4 | L 1 | L 4 | L 4 | L 1 | L 1 | L 4 | L 1 | L 1 | L 4 |
| Dielectric loss factor tgδ (50 c.p.s.) in percent, at 20° C | 1.0 | 2.5 | 2.0 | 0.7 | 3.8 | 0.8 | 1.1 | 0.5 | 2.1 | 2.1 | 0.8 | 2.5 | 0.8 |

Curing conditions used in tests:

1, 2, 3 — 5 hours at room temperature, then 14 hours at 90° C.
4, 5, 6, 7 — 3 days at room temperature.
8, 9, 10 — 5 hours at room temperature, then 14 hours at 90° C.
11, 12, 13 — 7 days at room temperature.

EXAMPLE 7

100 parts each of the epoxy resin B described in Example 2 are intimately mixed at room temperature with 25 parts each of a polyamine prepared by reacting 73.6 parts of triethylenetetramine with 26.4 parts of propylene oxide (= polyamine A). Specimen 1 contains 150 parts of quartz meal; the specimens according to this invention contian: specimen 2—70 parts of the MF-resin B of Example 2 and specimen 3—45 parts of the HF-resin A of Example 2.

The casting resin mixtures were cast in aluminum moulds as described in Example 1 and cured for 3 days at room temperature.

Whereas the deflection and flexural strength of the specimens 2 and 3 of this invention are comparable with those of specimen 1 filled with quartz meal, their arc resistance and leakage current stability is distinctly better. The same is true of the dielectric loss factor tgδ at 20° and 60° C.

TABLE 7

| Test | 1 | 2 | 3 |
|---|---|---|---|
| Epoxy resin B | 100 | 100 | 100 |
| Polyamine A | 25 | 25 | 25 |
| Quartz meal | 150 | | |
| MF-resin B | | 70 | |
| HF-resin A | | | 45 |
| Deflection, in mm | 1.9 | 3.0 | 2.6 |
| Flexural strength VSM 77103, in kg./mm.² | 8.2 | 5.4 | 5.9 |
| Arc resistance DIN 53484 (stage) | L 1 | L 4 | L 4 |
| Leakage current stability VDE 0303 (stage) | KA₂ | KA₃C | KA₃C |
| Dielectric loss factor VDE 0303 tgδ (50 c.p.s.) in percent: | | | |
| At 20° C | 2.7 | 0.8 | 1.1 |
| At 60° C | 4.4 | 1.2 | 2.2 |

EXAMPLE 8

100 parts of a hexahydrophthalic acid diglycidyl ester marketed by Messrs. Bayer under the registered tradename Lekutherm 2159 (containing 6.1 epoxide equivalents per kg.) are mixed at 120 to 130° C. with 78 parts of phthalic anhydride and 71 parts of the MF-resin A described in Example 1 (bulk weight 280 g./litre) and the mixture is poured into aluminium moulds (130 x 130 x 4 mm. and 130 x 130 x 2 mm.) as described in Example 1. The specimen was precured for 4 hours at 120° C. and then its curing finished for 24 hours at 140° C. The castings of this invention display a flexural strength according to VSM 77103 of 10 kg. per mm.², an impact strength according to VSM 77105 of 7 cm. kg./cm.², the highest stage L 4 in measuring the arc resistance according to DIN 53484 and a very low loss factor tgδ according to VDE 0303 of 0.5%. Compared with these values a known specimen containing as filler 310 parts of a quartz meal marketed under the tradename "Quartz Meal K8" instead of MF-resin A possesses similar mechanical properties, but it displays the lowest arc resistance stage L 1 and a loss factor tgδ greater than 1%.

EXAMPLE 9

100 parts of a triglycidyl isocyanurate, marketed by Messrs. Henkel under the registered tradename Metallon E 5010 (containing 9.45 epoxide equivalents per kg.) are dissolved at 80° C. in 123 parts of hexahydrophthalic anhydride and 90 parts of the MF-resin A of Example 1 are added, and the whole is cast in aluminium moulds as described in Example 8. After a preliminary curing for 4 hours at 80° C. and final curing for 12 hours at 120° C., the castings displayed the highest stage L 4 in the determination of the arc resistance according to DIN 53484 and a very favourable loss factor tgδ according to VDE 0303 of 0.7%.

What is claimed is:

1. A filler containing a curable resin composition which does not yield volatile substances while being cured and which comprises:
   (A) a curable resin system selected from the group consisting of
      (1) a mixture of an epoxy resin and a curing agent for said epoxy resin, in an amount sufficient to cure the resin;
      (2) a precondensate from an epoxy resin and a curing agent for said epoxy resin, in an amount sufficient to cure the resin; a crosslinking agent for said polyisocyanate; and
   (B) as a filler an insoluble, infusible and fully cured aminoplast resin which is insoluble in the curable resin system (A); wherein said aminoplast is present in an amount of from 1% to 80% by weight of the total composition.

2. A resin composition as claimed in claim 1, wherein the filler (B) is a totally cured, comminuted melamine-formaldehyde resin.

3. A resin composition as claimed in claim 1, wherein the filler (B) is a totally cured, comminuted urea-formaldehyde resin.

4. A resin composition as claimed in claim 1, wherein the filler (B) is present in an amount of 10 to 60% by weight calculated on the weight of the total composition.

5. A resin composition as claimed in claim 1, wherein the resin system (A) comprises a mixture of an epoxy resin and a polycarboxylic acid anhydride.

6. A resin composition as claimed in claim 5, wherein the resin system (A) essentially consists of a mixture of an epoxy resin, a polycarboxylic acid anhydride and a curing accelerator.

References Cited

UNITED STATES PATENTS

| | | | |
|---|---|---|---|
| 2,511,913 | 6/1950 | Greenlee | 260—834 |
| 2,528,359 | 10/1950 | Greenlee | 260—834 |
| 2,528,360 | 10/1950 | Greenlee | 260—834 |
| 2,591,539 | 4/1952 | Greenlee | 260—834 |
| 3,268,620 | 8/1966 | Tarwid | 260—834 |
| 3,294,574 | 12/1966 | Salama | 260—834 |
| 3,315,010 | 4/1967 | Graham | 260—834 |
| 3,367,991 | 2/1968 | Hicks | 260—834 |

FOREIGN PATENTS 1,041,244  10/1958  Germany.

MURRAY TILLMAN, Primary Examiner

P. LIEBMAN, Assistant Examiner

U.S. Cl. X.R.

260—2, 6, 13, 15, 16, 18, 30.4, 30.6, 31.8, 37, 40, 47, 75, 77.5, 78.4, 824, 830, 849, 850

CASE 5799/E

PO-1050
(5/69)

UNITED STATES PATENT OFFICE
CERTIFICATE OF CORRECTION

Patent No. 3,470,266      Dated September 30, 1969

Inventor(s) HANS BATZER ET AL

It is certified that error appears in the above-identified patent and that said Letters Patent are hereby corrected as shown below:

Column 14, lines 11 and 12, the expression "a cross-linking agent for said polyisocyanate;" should be deleted.

SIGNED AND
SEALED
NOV 24 1970

Nov 24, 1970

(SEAL)
Attest:

Edward M. Fletcher, Jr.
Attesting Officer

WILLIAM E. SCHUYLER, JR.
Commissioner of Patents